(12) United States Patent
Hu

(10) Patent No.: US 9,792,815 B2
(45) Date of Patent: Oct. 17, 2017

(54) DRIVING ASSISTANCE APPARATUS AND PROGRAM

(71) Applicant: DENSO CORPORATION, Kariya, Aichi-pref. (JP)

(72) Inventor: Jian Hu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/366,486

(22) Filed: Dec. 1, 2016

(65) Prior Publication Data

US 2017/0162044 A1 Jun. 8, 2017

(30) Foreign Application Priority Data

Dec. 4, 2015 (JP) .................................. 2015-237550

(51) Int. Cl.
G08G 1/09 (2006.01)
G08G 1/0967 (2006.01)
G06K 9/00 (2006.01)

(52) U.S. Cl.
CPC ....... *G08G 1/0967* (2013.01); *G06K 9/00798* (2013.01)

(58) Field of Classification Search
CPC ........... G08G 1/096716; G08G 1/0967; G08G 1/096775
USPC ..... 340/425.5, 435–438, 901–905, 933–944; 701/36, 41–43, 70, 93, 301
See application file for complete search history.

(56) References Cited

U.S. PATENT DOCUMENTS

| | | | |
|---|---|---|---|
| 2010/0315217 A1 | 12/2010 | Miura et al. | |
| 2011/0234390 A1* | 9/2011 | Danner | B60T 8/17557 340/438 |
| 2012/0188374 A1* | 7/2012 | Taner | B60W 30/18163 348/148 |

FOREIGN PATENT DOCUMENTS

JP 2010-287162 A 12/2010

* cited by examiner

*Primary Examiner* — Kerri McNally
*Assistant Examiner* — Sharmin Akhter
(74) *Attorney, Agent, or Firm* — Knobbe, Martens, Olson & Bear, LLP

(57) ABSTRACT

A driving assistance apparatus determines whether or not a road section corresponding to a current location of an own vehicle corresponds to a no-passing zone. A leading vehicle present ahead of the own vehicle is detected. An operation state of the detected leading vehicle is recognized. A passing maneuver performed by the own vehicle to pass the detected leading vehicle is detected. A warning operation to output a warning to a driver of the own vehicle is performed, when the passing maneuver is detected under a condition that the road section corresponding to the current location is determined to correspond to the no-passing zone. The warning operation is prohibited when the recognized operation state of the leading vehicle meets a predetermined passing-allowed condition that is a condition under which passing is allowed.

10 Claims, 4 Drawing Sheets

FIG.4

DRIVING ASSISTANCE APPARATUS AND PROGRAM

CROSS-REFERENCE TO RELATED APPLICATION

This application is based on and claims the benefit of priority from Japanese Patent Application No. 2015-237550, filed Dec. 4, 2015. The entire disclosure of the above application is incorporated herein by reference.

BACKGROUND

Technical Field

The present disclosure relates to a driving assistance apparatus that outputs a warning to a driver when an own vehicle detects a passing maneuver in a no-passing zone.

Related Art

A technology is known in which a driver is issued a warning when an own vehicle detects a passing maneuver in which the own vehicle passes a leading vehicle, while the own vehicle is traveling on a road in which passing is prohibited by law (referred to, hereafter, as a no-passing zone). "Passing" herein refers to a driving maneuver in which, when a vehicle catches up with another vehicle that is present ahead of the vehicle on the same course, the vehicle changes course to pass the side of the other vehicle and reenters the original course ahead of the other vehicle.

For example, JP-A-2010-287162 describes a technology in which, when the own vehicle changes course from a first traffic lane to a second traffic lane in a no-passing zone and passes a target vehicle, and then changes course to the first lane ahead of the target vehicle, the driver is given feedback of an evaluation determining the maneuver to be dangerous.

In the related technology, the driver is issued a warning even in cases in which the passing maneuver is performed in objectively unavoidable situations, such as when the own vehicle passes a stopped vehicle or a vehicle that is traveling at a low speed due to reasons such as malfunction or roadworks. In such cases, a problem occurs in that the driver experiences irritation.

SUMMARY

It is thus desired to provide a technology for suppressing unnecessary warnings, through appropriate determination of whether or not a warning is required, based on circumstances in which an own vehicle passes a leading vehicle in a no-passing zone.

An exemplary embodiment provides a driving assistance apparatus including a no-passing determining unit, a vehicle detecting unit, an operation state recognizing unit, a passing detecting unit that detects a passing maneuver, and a warning control unit. Reference numbers within the parentheses in this section and the scope of claims indicate corresponding relationships with specific means according to an embodiment described hereafter as an aspect, and do not limit the technical scope of the present disclosure.

The no-passing determining unit determines whether or not a road section corresponding to a current location of an own vehicle corresponds to a no-passing zone. The vehicle detecting unit detects a leading vehicle that is a vehicle present ahead of the own vehicle on a course on which the own vehicle is traveling. The operation state recognizing unit recognizes an operation state of the leading vehicle detected by the vehicle detecting unit. The passing detecting unit detects a passing maneuver that is a maneuver performed by the own vehicle to pass the leading vehicle detected by the vehicle detecting unit.

The warning control unit performs a warning operation that is an operation to output a warning to a driver of the own vehicle, when the passing detecting unit detects the passing maneuver under a condition that the no-passing determining unit determines that the road section corresponding to the current location corresponds to the no-passing zone. However, when the operation state of the leading vehicle recognized by the operation state recognizing unit meets a predetermined passing-allowed condition that is a condition under which passing is allowed, the warning control unit prohibits the warning operation.

A configuration of the driving assistance apparatus described above makes it possible to accurately determine whether or not a warning operation regarding a passing maneuver by the own vehicle is necessary, based on the operation state of the leading vehicle. Therefore, control can be performed so as not to output a warning when, for example, the own vehicle passes a leading vehicle that is behaving in a manner differing from that of normal traveling mode, on the course on which the own vehicle is traveling. Irritation experienced by the driver can be reduced.

DESCRIPTION OF THE EMBODIMENTS

An embodiment of the present disclosure will be described with reference to the drawings. The present disclosure is not limited to the embodiment described below. Various embodiments are possible.

1. Description of a Configuration of a Driving Assistance Apparatus

Figure 1:
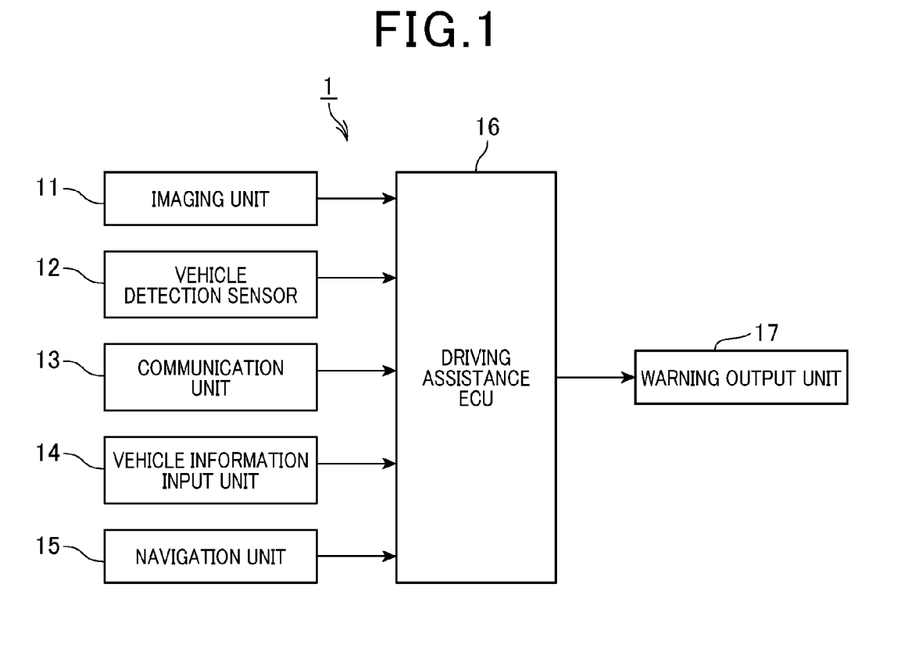
FIG. 1 is a block diagram of a configuration of a driving assistance system according to an embodiment.

A configuration of a driving assistance system 1 according to the embodiment will be described with reference to FIG. 1. The driving assistance system 1 is mounted in a vehicle (referred to, hereafter, as an own vehicle). As shown in the example in FIG. 1, the driving assistance system 1 includes an imaging unit 11, a vehicle detection sensor 12, a communication unit 13, a vehicle information input unit 14, a navigation unit 15, a driving assistance electronic control unit (ECU) 16, and a warning output unit 17. The driving assistance system 1 provides a function of outputting a warning to a driver based on whether or not a passing-allowed condition is met, when the own vehicle detects a passing maneuver in which the own vehicle passes a leading vehicle.

The imaging unit 11 is set so as to face a direction ahead of the own vehicle. The imaging unit 11 captures an image of an area ahead of the own vehicle and outputs data expressing the captured image to the driving assistance ECU 16.

The vehicle detection sensor 12 is an object sensor for detecting whether or not a target object is present within a target detection area ahead of the own vehicle. The vehicle detection sensor 12 is also used to detect a distance from the own vehicle to the target object and a direction in which the target object is present. For example, the vehicle detection sensor 12 is actualized by an ultrasonic sensor, a millimeter wave radar, or a laser radar.

According to the present embodiment, the imaging unit 11 and the vehicle detection sensor 12 are assumed to be used as sensors for recognizing another vehicle (referred to, hereafter, as a leading vehicle) that is present ahead of the own vehicle on a course on which the own vehicle is traveling. In addition, an intended use is assumed to be that an operation state of the leading vehicle is recognized through analysis of the image captured by the imaging unit 11.

The communication unit 13 is a wireless communication unit that performs wireless communication (that is, inter-vehicle communication) with a communication unit mounted in another vehicle. The driving assistance ECU 16 performs inter-vehicle communication with the leading vehicle through the communication unit 13, and acquires various types of information provided by the leading vehicle. According to the present embodiment, an intended use is assumed to be that the operation state of the leading vehicle is recognized through use of the information acquired by the communication unit 12.

The vehicle information input unit 14 inputs various types of information indicating a state of the own vehicle to the driving assistance ECU 16. According to the present embodiment, the information indicating the state of the own vehicle is assumed to be measurement values from sensors that perform measurement related to the behavior of the own vehicle, such as speed (that is, vehicle speed), acceleration, and angular velocity, operating signals, such as signals for a steering wheel operation, accelerator pedal operation, and brake pedal operation performed by the driver, and the like. The vehicle information input unit 14 outputs the data measured by each instrument of the own vehicle to the driving assistance ECU 16.

The navigation unit 15 is an electronic control unit that configures the core of a known navigation system. The navigation unit 15 performs route guidance to a destination based on a current location detected through use of a global positioning system (GPS) receiver (not shown) or the like, and road map data. The road map data used by the navigation unit 15 for route guidance includes information related to links that correspond to roads and nodes that correspond to branches in the roads. The information related to a link of a road includes data such as road type, road width, number of traffic lanes, speed limit, statutory regulations such as no-passing, and route cost. According to the present embodiment, an intended use is assumed to be that the navigation unit 15 acquires current location information indicating the current location of the own vehicle, and road information related to no-passing zones. The no-passing zone is a section of a road on which passing is prohibited by law.

The driving assistance ECU 16 is an information processing unit that is mainly configured by a central processing unit (CPU), a random access memory (RAM), a read-only memory (ROM), a semiconductor memory such as a flash memory, an input/output interface, and the like. For example, the driving assistance ECU 16 is actualized by a microcontroller integrating functions as a computer system. The functions of the driving assistance ECU 16 are actualized by the CPU running a program stored in a non-transitory, tangible storage medium, such as the ROM or the semiconductor memory. The method for actualizing the functions of the driving assistance ECU 16 is not limited to that using software. Some or all elements may be actualized through use of hardware combining a logic circuit, an analog circuit, and the like. A single microcontroller or more may be used to configure the driving assistance ECU 16. The driving assistance ECU 16 performs a passing-allowed determination process and a passing monitoring process based on the above-described program. A detailed description of the processes will be given hereafter.

Figure 4:
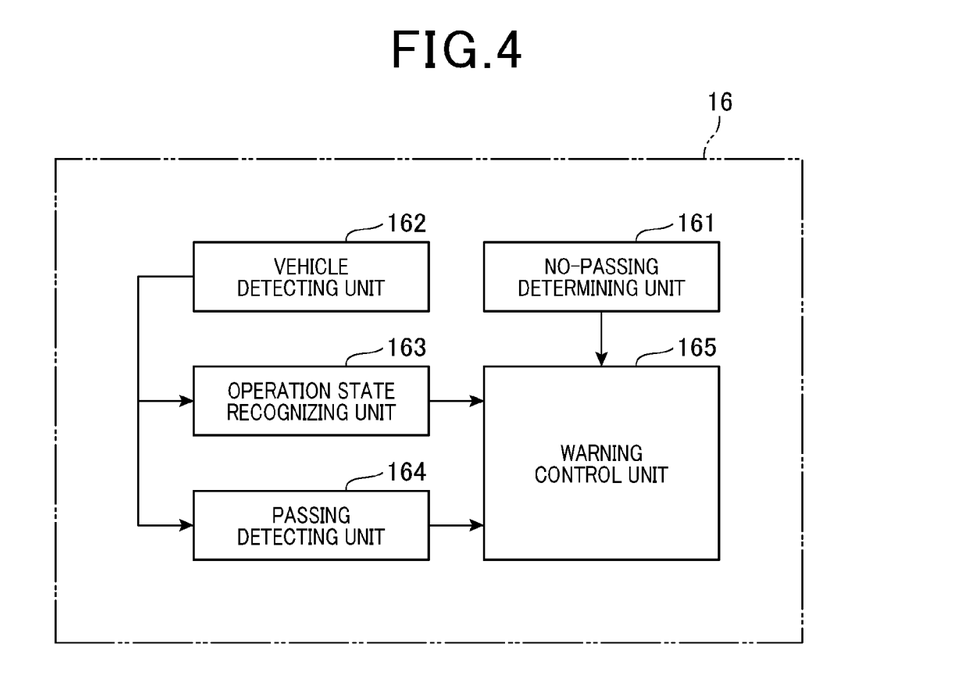
FIG. 4 is block diagram showing a functional configuration of the driving assistance ECU in FIG. 1.

In the driving assistance ECU 16, the CPU executes one or more programs stored in advance in the memory (e.g., ROM) to perform a predetermined process as described in detail below. Thus, as shown in FIG. 4, the driving assistance ECU 16 is capable of working as a driving assistance apparatus that includes a no-passing determining unit 161, a vehicle detecting unit 162, an operation state recognizing unit 163, a passing detecting unit 164, and a warning control unit 165.

The warning output unit 17 outputs a warning to the driver. For example, the warning output unit 17 is actualized by a display unit for displaying image information to the driver or an audio output unit for presenting information to the driver through sound. According to the present embodiment, an intended use is assumed to be that the own vehicle issues a warning to the driver when the own vehicle performs a passing maneuver to pass a leading vehicle in a no-passing zone.

2. Description of the Passing-Allowed Determination Process

The steps in the passing-allowed determination process performed by the driving assistance ECU 16 will be described with reference to the flowchart in FIG. 2. The process is repeatedly performed at a predetermined control cycle.

At step S100, the driving assistance ECU 16 determines whether or not a road section corresponding to the current location of the own vehicle is a no-passing zone. The driving assistance ECU 16 performs the process at step S100, and then is also capable of working as the no-passing determining unit 161 in FIG. 4.

Specifically, the driving assistance ECU 16 may make the determination based on the current location information and road information acquired from the navigation unit 15. Alternatively, the driving assistance ECU 16 may recognize a center line on the road from an image captured by the imaging unit 11, and make the determination based on the type of the recognized center line. Moreover, the driving assistance ECU 16 may make the determination by recognizing a no-passing sign based on an image captured by the imaging unit 11.

When determined that the road section corresponding to the current location is not a no-passing zone (that is, NO at step S100), the driving assistance ECU 16 proceeds to step S108. Meanwhile, when determined that the road section corresponding to the current location is a no-passing zone (that is, YES at step S100), the driving assistance ECU 16 proceeds to step S102.

At step S102, the driving assistance ECU 16 detects a leading vehicle that is present ahead of the own vehicle on the course on which the own vehicle is traveling, based on information acquired by the imaging unit 11 and the vehicle detection sensor 12. The driving assistance ECU 16 performs the process at step S102, and then is capable of working as the vehicle detecting unit 162 in FIG. 4.

At step S104, the driving assistance ECU 16 recognizes an operation state of the leading vehicle detected at step S102. The driving assistance ECU 16 performs the process at step S104, and then is capable of working as the operation state recognizing unit 163 in FIG. 4.

Here, the driving assistance ECU 16 recognizes an operation state that corresponds to the passing-allowed condition regarding which a determination is made at step S106, described hereafter. The passing-allowed condition has a plurality of aspects.

For example, as an example of an aspect of the passing-allowed condition, a determination is made regarding the vehicle speed of the leading vehicle. In this case, the driving assistance ECU 16 acquires information indicating the vehicle speed of the leading vehicle at step S104.

Specifically, the driving assistance ECU 16 calculates the vehicle speed of the leading vehicle using a relative speed and the vehicle speed of the own vehicle. The relative speed is calculated based on changes over time in the distance between the own vehicle and the leading vehicle measured by the vehicle detection sensor 12. In addition, the driving assistance ECU 16 may acquire information indicating the vehicle speed from the leading vehicle using inter-vehicle communication through the communication unit 13.

As an example of an aspect of the passing-allowed condition, a determination is made regarding an illumination state of a turn indicator provided in the leading vehicle. In this case, the driving assistance ECU 16 acquires information indicating the illumination state of the turn indicator of the leading vehicle, as the operation state.

Specifically, the driving assistance ECU 16 may recognize an image portion corresponding to the turn indicator of the leading vehicle from an image captured by the imaging unit 11. The driving assistance ECU 16 may then identify the illumination state of the turn indicator based on changes over time in the luminance of the image portion. In addition, the driving assistance ECU 16 may acquire the information indicating the illumination state of the turn indicator of the leading vehicle using inter-vehicle communication through the communication unit 13.

As an example of an aspect of the passing-allowed condition, a determination is made regarding a positional relationship between the leading vehicle and a road-edge side of the road. In this case, the driving assistance ECU 16 acquires information indicating the positional relationship between the position of the leading vehicle on the road and the position of a structure on the road-edge side of the road, as the operation state. The road-edge side of the road herein refers to a portion of the road, such as a shoulder or a side strip, that is provided so as to be connected to the outer side of a vehicular lane.

Specifically, the driving assistance ECU 16 recognizes an image portion corresponding to a structure (such as a roadway edge marking or a curbstone) that separates the vehicular lane of the road from the shoulder or the side strip and an image portion corresponding to the leading vehicle, from an image captured by the imaging unit 11. The driving assistance ECU 16 then identifies a degree of proximity between the image portions.

In addition, as an example of an aspect of the passing-allowed condition, a determination is made regarding the presence of a piece of stop-warning equipment for the leading vehicle. In this case, the driving assistance ECU 16 acquires information related to whether or not a piece of stop-warning equipment is set near the leading vehicle, as the operation state. The stop-warning equipment is used to give notice of a stopped vehicle. Specifically, for example, the stop-warning equipment includes a warning triangle, a stop warning lamp, and a flare that are set to ensure safety from behind when a vehicle is stopped on a road. The driving assistance ECU 16 recognizes an image portion that corresponds to a piece of stop-warning equipment from an image area corresponding to space before or near the leading vehicle in an image captured by the imaging unit 11. The driving assistance ECU 16 then identifies that the piece of stop-warning equipment is set near the leading vehicle.

At step S106, the driving assistance ECU 16 determines whether or not the operation state of the leading vehicle recognized at step S104 meets a predetermined passing-allowed condition. Here, the driving assistance ECU 16 may make the determination using a single passing-allowed condition, among the various passing-allowed conditions described above.

Alternatively, the driving assistance ECU 16 may comprehensively make the determination using the plurality of the passing-allowed conditions. In the latter case, for example, the driving assistance ECU 16 may make an affirmative determination when at least a single condition among the plurality of passing-allowed conditions is met. The driving assistance ECU 16 may make a negative determination when none of the passing-allowed conditions is met.

Specifically, as an example of the passing-allowed condition, the driving assistance ECU 16 determines whether or not the vehicle speed of the leading vehicle is a reference speed or lower. Here, the reference speed may be uniformly prescribed. Alternatively, the passing-allowed condition may be that the vehicle speed is lower than the legal speed limit of the road in the current location by a certain value or more.

When determined that the vehicle speed of the leading vehicle is the reference speed or lower (that is, YES at step S106), the driving assistance ECU 16 proceeds to step S108. Meanwhile, when determined that the vehicle speed of the leading vehicle is higher than the reference speed (that is, NO at step S106), the driving assistance ECU 16 proceeds to step S110.

Alternatively, as an example of the passing-allowed condition, the driving assistance ECU 16 determines whether or not the turn indicator of the leading vehicle is in an illumination state that indicates an intention to stop. The illumination state indicating an intention to stop is, for example, a hazard lamp in which the left and right turn indicators are simultaneously flashed ON and OFF.

When determined that the turn indicator of the leading vehicle is in an illumination state indicating an intention to stop (that is, YES at step S106), the driving assistance ECU 16 proceeds to step S108. Meanwhile, when determined that the turn indicator of the leading vehicle is not in an illumination state indicating an intention to stop (that is, NO at step S106), the driving assistance ECU 16 proceeds to step S110.

Alternatively, as an example of the passing-allowed condition, the driving assistance ECU 16 determines whether or not the leading vehicle is near the road-edge side by a certain distance or more. Specifically, the driving assistance ECU 16 determines that the leading vehicle is near the road-edge side by a certain distance or more when the distance between the leading vehicle and the structure separating the vehicular lane and the shoulder or the side strip is a reference value or less, or when at least a portion of the leading vehicle has crossed beyond the vehicular lane and onto the shoulder or the side strip.

When determined that the leading vehicle is near the road-edge side by a certain distance or more (that is, YES at step S106), the driving assistance ECU 16 proceeds to step S108. Meanwhile, when determined that the leading vehicle is not near the road-edge side by a certain distance or more (that is, NO at step S106), the driving assistance ECU 16 proceeds to step S110.

Alternatively, as an example of the passing-allowed condition, the driving assistance ECU 16 determines whether or not a piece of stop-warning equipment is set near the leading vehicle. When determined that a piece of stop-warning equipment is set near the leading vehicle (that is, YES at step S106), the driving assistance ECU 16 proceeds to step S108. Meanwhile, when determined that a piece of stop-warning equipment is not set near the leading vehicle (that is, NO at step S106), the driving assistance ECU 16 proceeds to step S110.

At step S108 to which the driving assistance ECU 16 proceeds when the operation state of the leading vehicle meets the passing-allowed condition, the driving assistance ECU 16 selects "do not issue warning," which is an operation mode in which a warning regarding the passing maneuver is not issued. Meanwhile, at step S110 to which the driving assistance ECU 16 proceeds when the operation state of the leading vehicle does not meet the passing-allowed condition, the driving assistance ECU 16 selects "issue warning," which is an operation mode in which a warning regarding the passing maneuver is issued.

3. Description of the Passing Monitoring Process

Figure 3:
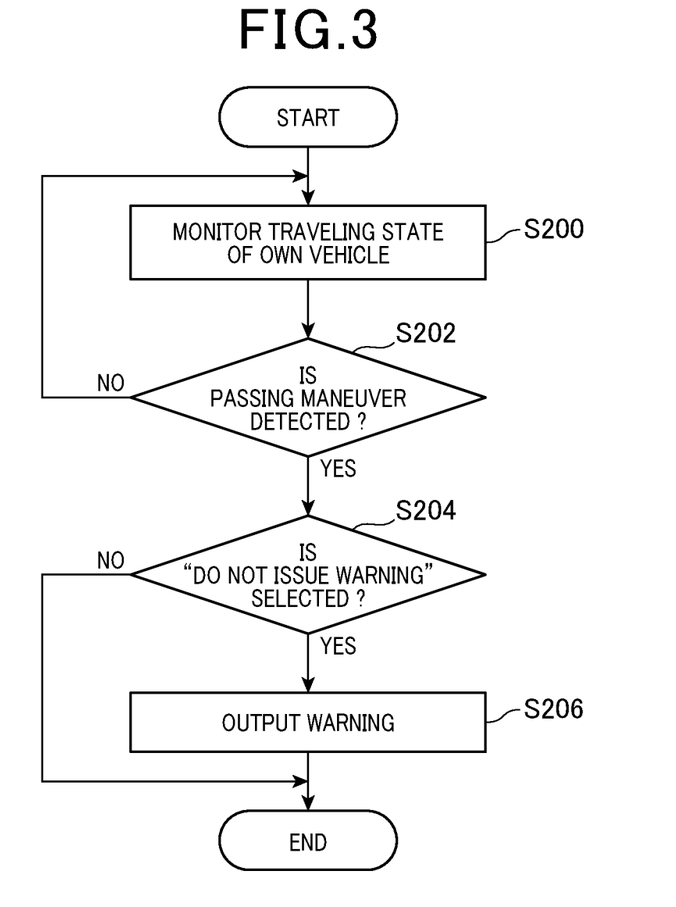
FIG. 3 is a flowchart of the steps in a passing monitoring process performed by the driving assistance ECU in FIG. 1.

The steps in the passing monitoring process performed by the driving assistance ECU 16 will be described with reference to the flowchart in FIG. 3. The process is repeatedly performed at a predetermined control cycle.

At step S200, the driving assistance ECU 16 monitors a traveling state of the own vehicle based on the various types of information acquired from the imaging unit 11, the vehicle detection sensor 12, the vehicle information input unit 14, and the navigation unit 15, and detects a passing maneuver.

For example, the driving assistance ECU 16 detects, as the passing maneuver, a series of behavior or driving operations of the own vehicle in which, when a leading vehicle is present within a certain distance from the own vehicle on the course on which the own vehicle is traveling, the own vehicle changes course (that is, changes lanes) and passes the leading vehicle. A method for detecting the passing maneuver is publicly known. Therefore, further detailed description thereof is omitted.

At step S202, the driving assistance ECU 16 determines whether or not a passing maneuver is detected at step S200. When determined that a passing maneuver is not detected (that is, NO at step S202), the driving assistance ECU 16 returns to step S200. Meanwhile, when determined that a passing maneuver is detected (that is, YES at step S202), the driving assistance ECU 16 proceeds to step S204. The driving assistance ECU 16 performs the processes at steps S200 and S202, and then is capable of working as the passing detecting unit 164 in FIG. 4.

Figure 2:
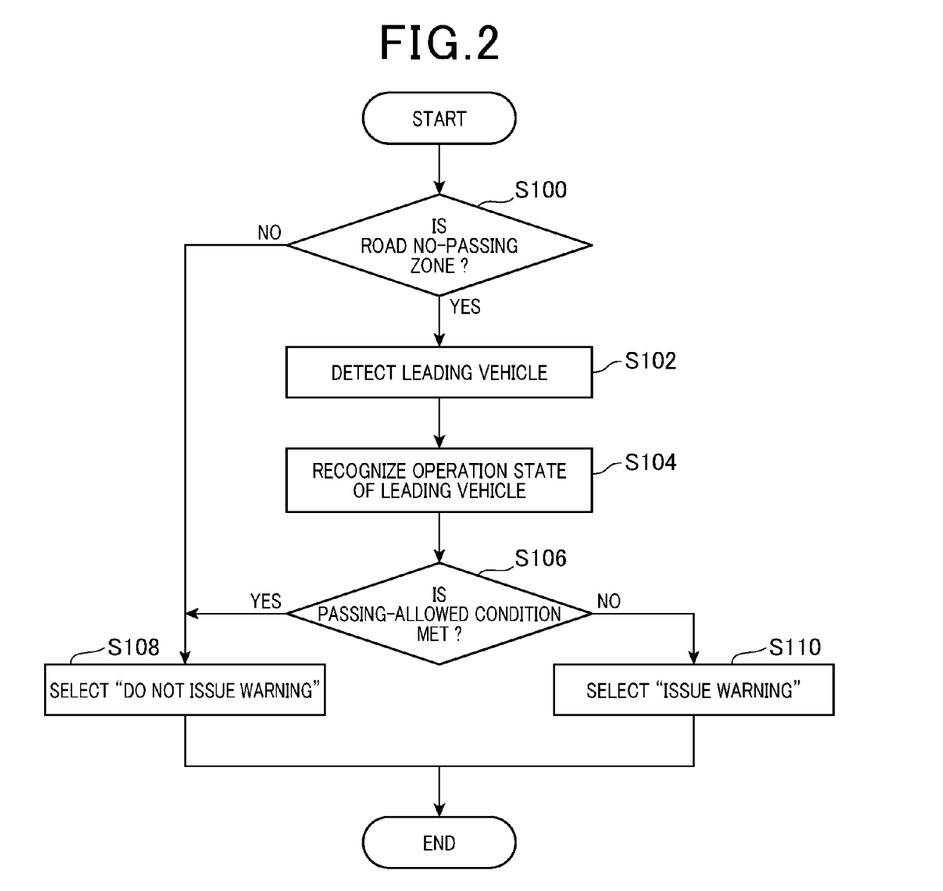
FIG. 2 is a flowchart of the steps in a passing-allowed determination process performed by a driving assistance electronic control unit (ECU) of the driving assistance system in FIG. 1.

At step S204, the driving assistance ECU 16 determines whether or not "do not issue warning" is selected in the passing-allowed determination process shown in FIG. 2. When determined that "do not issue warning" is selected (that is, YES at step S204), the driving assistance ECU 16 ends the present process. Meanwhile, when determined that "issue warning" is selected (that is, NO at step S204), the driving assistance ECU 16 proceeds to step S206.

At S206, the driving assistance ECU 16 outputs a warning regarding the passing maneuver through the warning output unit 17. The driving assistance ECU 16 performs the processes at steps S204 and S206, and then is capable of working as the warning control unit 165 in FIG. 4.

[Effects]

The following effects are achieved by the driving assistance system 1 according to the embodiment.

Whether or not a warning operation regarding a passing maneuver performed by the own vehicle is necessary can be determined based on whether or not the operation state of the leading vehicle meets a passing-allowed condition. As a result, control can be performed so as not to output a warning when the own vehicle passes a leading vehicle that is in an operation state differing from that of normal traveling mode, on the course on which the own vehicle is traveling.

As the operation state of the leading vehicle related to the passing-allowed condition, for example, the determination can be made regarding the vehicle speed of the leading vehicle, the illumination state of the turn indicator, the position on the road, and the presence of a piece of stop-warning equipment. A configuration described above makes it possible to accurately determine, cases in which the own vehicle performs a passing maneuver in objectively unavoidable situations, such as when passing a stopped vehicle or a vehicle that is traveling at a low speed due to reasons such malfunction or roadwork. Warning in such cases can be suppressed.

4. Correspondence to Configuration Recited in the Claims

The configurations according to the embodiment and the configurations recited in the claims correspond in the following manner. The process performed by the driving assistance ECU 16 at step S100 corresponds to the process performed by the no-passing determining unit 161 in FIG. 4. The process performed by the driving assistance ECU 16 at step S102 corresponds to the process performed by the vehicle detecting unit 162 in FIG. 4. The process performed by the driving assistance ECU 16 at step S104 corresponds to the process performed by an operation state recognizing unit 163 in FIG. 4. The processes performed by the driving assistance ECU 16 at steps S200 and S202 correspond to the processes performed by the passing detecting unit 164 in FIG. 4. The processes performed by the driving assistance ECU 16 at steps S204 and S206 correspond to the processes performed by the warning control unit 165 in FIG. 4.

[Variation Examples]

A function provided by a single constituent element according to the above-described embodiment may be dispersed among a plurality of constituent elements. Functions provided by a plurality of constituent elements may be integrated in a single constituent element. In addition, a part of a configuration according the above-described embodiment may be omitted to an extent enabling the problem to be solved. Furthermore, at least a part of a configuration according to the present embodiment may be added to or replace another configuration according to the above-described embodiment. Any embodiment included in the technical scope specified by the wordings of the scope of claims is an embodiment of the present disclosure.

The present disclosure can also be actualized by various modes, such as a program enabling a computer to function as the above-described driving assistance ECU 16, a non-transitory, computer-readable (tangible) storage medium such as a semiconductor memory on which the program is recorded, and the like.

What is claimed is:

1. A driving assistance apparatus comprising:
a no-passing determining unit that determines whether or not a road section corresponding to a current location of an own vehicle corresponds to a no-passing zone;
a vehicle detecting unit that detects a leading vehicle that is a vehicle present ahead of the own vehicle on a course on which the own vehicle is traveling;
an operation state recognizing unit that recognizes an operation state of the leading vehicle detected by the vehicle detecting unit;
a passing detecting unit that detects a passing maneuver that is a maneuver performed by the own vehicle to pass the leading vehicle detected by the vehicle detecting unit; and
a warning control unit that performs a warning operation that is an operation to output a warning to a driver of the own vehicle, when the passing detecting unit detects the passing maneuver under a condition that the no-passing determining unit determines that the road section corresponding to the current location corresponds to the no-passing zone,
the warning control unit being configured to prohibit the warning operation when the operation state of the leading vehicle recognized by the operation state recognizing unit meets a predetermined passing-allowed condition that is a condition under which passing is allowed.

2. The driving assistance apparatus according to claim 1, wherein:
the operation state recognizing unit is configured to recognize a speed of the leading vehicle as the operation state of the leading vehicle; and
the warning control unit is configured to prohibit the warning operation when the speed of the leading vehicle recognized by the operation state recognizing unit is equal to or lower than a reference speed set as the predetermined passing-allowed condition.

3. The driving assistance apparatus according to claim 2, wherein:
the operation state recognizing unit is configured to recognize an illumination state of a turn indicator provided in the leading vehicle, as the operation state of the leading vehicle; and
the warning control unit is configured to prohibit the warning operation when the illumination state of the turn indicator recognized by the operation state recognizing unit corresponds to a specific illumination pattern set as the predetermined passing-allowed condition.

4. The driving assistance apparatus according to claim 3, wherein:
the operation state recognizing unit is configured to recognize a positional relationship between the leading vehicle and a road-edge side of the road as the operation state of the leading vehicle; and
the warning control unit is configured not to perform the warning operation regardless of the detection result from the passing detecting unit when the positional relationship between the leading vehicle and the road-edge side of the road recognized by the operation state recognizing unit corresponds to a specific positional relationship set as the predetermined passing-allowed condition,
the warning control unit being configured to perform the warning operation when the passing detecting unit detects the passing maneuver when the positional relationship between the leading vehicle and the road-edge side of the road does not correspond to the specific positional relationship.

5. The driving assistance apparatus according to claim 4, wherein:
the operation state recognizing unit is configured to recognize whether or not a piece of stop-warning equipment is set as the operation state of the leading vehicle, the stop-warning equipment being a piece of equipment for giving notice of a stopped vehicle; and
the warning control unit is configured to prohibit the warning operation when the operation state recognizing unit recognizes that a piece of stop-warning equipment for the leading vehicle is set.

6. The driving assistance apparatus according to claim 1, wherein:
the operation state recognizing unit is configured to recognize an illumination state of a turn indicator provided in the leading vehicle, as the operation state of the leading vehicle; and
the warning control unit is configured to prohibit the warning operation when the illumination state of the turn indicator recognized by the operation state recognizing unit corresponds to a specific illumination pattern set as the passing-allowed condition.

7. The driving assistance apparatus according to claim 1, wherein:
the operation state recognizing unit is configured to recognize a positional relationship between the leading vehicle and a road-edge side of the road as the operation state of the leading vehicle; and
the warning control unit is configured not to perform the warning operation regardless of the detection result from the passing detecting unit when the positional relationship between the leading vehicle and the road-edge side of the road recognized by the operation state recognizing unit corresponds to a specific positional relationship set as the predetermined passing-allowed condition,
the warning control unit being configured to perform the warning operation when the passing detecting unit detects the passing maneuver when the positional relationship between the leading vehicle and the road-edge side of the road does not correspond to the specific positional relationship.

8. The driving assistance apparatus according to claim 1, wherein:
the operation state recognizing unit is configured to recognize whether or not a piece of stop-warning equipment is set as the operation state of the leading vehicle, the stop-warning equipment being a piece of equipment for giving notice of a stopped vehicle; and
the warning control unit is configured to prohibit the warning operation when the operation state recognizing unit recognizes that a piece of stop-warning equipment for the leading vehicle is set.

9. A non-transitory computer-readable storage medium storing a program enabling a computer to perform:
a no-passing determining step of determining whether or not a road section corresponding to a current location of an own vehicle corresponds to a no-passing zone;
a vehicle detecting step of detecting a leading vehicle that is a vehicle ahead of the own vehicle on a course on which the own vehicle is traveling;
an operation state recognizing step of recognizing an operation state of the lading vehicle detected at the vehicle detecting step;

a passing detecting step of detecting a passing maneuver performed by the own vehicle to pass the leading vehicle detected at the vehicle detecting step; and a warning control step of performing a warning operation that is an operation to output a warning to a driver of the own vehicle when the passing maneuver is detected at the passing detecting step under a condition that the road section corresponding to the current location is determined to correspond to the no-passing zone at the no-passing determining step, and prohibiting the warning operation when the operation state of the leading vehicle recognized at the operation state recognizing step meets a predetermined passing-allowed condition that is a condition under which passing is allowed.

10. A driving assistance method comprising:

determining, by a driving assistance apparatus mounted to an own vehicle, whether or not a road section corresponding to a current location of the own vehicle corresponds to a no-passing zone;

detecting, by the driving assistance apparatus, a leading vehicle that is a vehicle ahead of the own vehicle on a course on which the own vehicle is traveling;

recognizing, by the driving assistance apparatus, an operation state of the detected lading vehicle;

detecting, by the driving assistance apparatus, a passing maneuver performed by the own vehicle to pass the detected leading vehicle;

performing, by the driving assistance apparatus, a warning operation that is an operation to output a warning to a driver of the own vehicle when the passing maneuver is detected under a condition that the road section corresponding to the current location is determined to correspond to the no-passing zone; and prohibiting, by the driving assistance apparatus, the warning operation when the recognized operation state of the leading vehicle meets a predetermined passing-allowed condition that is a condition under which passing is allowed.

* * * * *

UNITED STATES PATENT AND TRADEMARK OFFICE
CERTIFICATE OF CORRECTION

PATENT NO. : 9,792,815 B2
APPLICATION NO. : 15/366486
DATED : October 17, 2017
INVENTOR(S) : Jian Hu Page 1 of 1

It is certified that error appears in the above-identified patent and that said Letters Patent is hereby corrected as shown below:

In the Specification

In Column 3 at Lines 47-58, Delete "The road map data used by the navigation unit 15 for route guidance includes information related to links that correspond to roads and nodes that correspond to branches in the roads. The information related to a link of a road includes data such as road type, road width, number of traffic lanes, speed limit, statutory regulations such as no-passing, and route cost. According to the present embodiment, an intended use is assumed to be that the navigation unit 15 acquires current location information indicating the current location of the own vehicle, and road information related to no-passing zones. The no-passing zone is a section of a road on which passing is prohibited by law." and insert the same on Column 3, Line 48 as a new paragraph.

In the Claims

In Column 10 at Line 66, In Claim 9, change "lading" to --leading--.

In Column 12 at Line 5 (approx.), In Claim 10, change "lading" to --leading--.

Signed and Sealed this
Twentieth Day of March, 2018

Andrei Iancu
*Director of the United States Patent and Trademark Office*